(12) United States Patent
Na et al.

(10) Patent No.: US 12,005,604 B2
(45) Date of Patent: Jun. 11, 2024

(54) NOZZLE OF REINFORCING MATERIAL CO-PRINTING TYPE 3D PRINTER FOR CONSTRUCTION

(71) Applicant: SAMSUNG E&A CO., LTD, Seoul (KR)

(72) Inventors: Ho Sung Na, Hanam (KR); Dong Hyun Kim, Seoul (KR); Ju In Park, Seoul (KR); Hyung Woo In, Seoul (KR); Hye Jin Ryu, Hanam (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/265,305

(22) PCT Filed: Jun. 15, 2022

(86) PCT No.: PCT/KR2022/008461
§ 371 (c)(1),
(2) Date: Jun. 5, 2023

(87) PCT Pub. No.: WO2022/270816
PCT Pub. Date: Dec. 29, 2022

(65) Prior Publication Data
US 2023/0339140 A1    Oct. 26, 2023

(30) Foreign Application Priority Data

Jun. 22, 2021 (KR) .................. 10-2021-0081202

(51) Int. Cl.
*B28B 23/02* (2006.01)
*B28B 1/00* (2006.01)
(Continued)

(52) U.S. Cl.
CPC .............. *B28B 23/02* (2013.01); *B28B 1/001* (2013.01); *B28B 3/2645* (2013.01); *B33Y 30/00* (2014.12)

(58) Field of Classification Search
CPC ... B29C 64/118; B29C 64/227; B29C 64/209; B33Y 70/10; B33Y 10/00; B33Y 30/00;
(Continued)

(56) References Cited

U.S. PATENT DOCUMENTS 5,936,861 A * 8/1999 Jang ...................... B33Y 70/10
700/98
2002/0031046 A1* 3/2002 Schneider ........... B01F 25/4316
366/337
(Continued)

FOREIGN PATENT DOCUMENTS

CN      106313496 A    1/2017
CN      108237613 A    7/2018
(Continued)

OTHER PUBLICATIONS

Machine English translation of Maslov A V (WO-2021040578-A1); Retrieved from https://worldwide.espacenet.com/patent/search/family/071136049/publication/EP4023417A1?q=pn%3DWO2021040578A1 (Year: 2020).*

(Continued)

*Primary Examiner* — Jeffrey M Wollschlager
*Assistant Examiner* — Edgaredmanuel Troche
(74) *Attorney, Agent, or Firm* — Panitch Schwarze Belisario & Nadel LLP

(57) ABSTRACT

The present disclosure relates to a 3D printer for construction for print-molding various structures, in which a main pipe 30 for transferring a filament material 31 therein is installed inside a nozzle 10 for discharging a printing material, such as concrete or mortar, to enable co-printing of (Continued)

the filament material 31 with the printing material while embedded in the printing material. According to the present disclosure, in constructing a structure by a 3D printer for construction, a printing material embedded with the filament material 31 as reinforcing material may be printed, and as a result, the effects of reinforcing tensile strength of the printed object and inhibiting crack of the printed object may be obtained.

3 Claims, 17 Drawing Sheets

(51) Int. Cl.
*B28B 3/26* (2006.01)
*B33Y 30/00* (2015.01)

(58) Field of Classification Search
CPC . B28B 3/2636; B28B 3/2645; B28B 13/0235; B28B 1/001; B28B 3/2672; B28B 3/2609; B22F 10/12; B22F 12/90; C04B 2111/00181; B01F 23/231265; B01F 23/431; B01F 23/64; B01F 25/42; B01F 25/431; B01F 25/431971; B01F 25/43; B01F 25/4316; B01F 25/431972; B01F 25/431973; B01F 25/431974
See application file for complete search history.

(56) References Cited

U.S. PATENT DOCUMENTS

| | | | | |
|---|---|---|---|---|
| 2009/0238911 | A1* | 9/2009 | Hayashi | B29C 48/022 425/202 |
| 2012/0121748 | A1* | 5/2012 | Planta Torralba | B05C 17/00546 425/174.2 |
| 2013/0286769 | A1* | 10/2013 | Baron | B01F 25/4316 366/337 |
| 2017/0015061 | A1* | 1/2017 | Lewicki | B33Y 10/00 |

FOREIGN PATENT DOCUMENTS

| | | | | | |
|---|---|---|---|---|---|
| CN | 208375524 | U | | 1/2019 | |
| CN | 109531953 | A | | 3/2019 | |
| CN | 113564588 | A | * | 10/2021 | |
| EP | 4023417 | A1 | * | 7/2022 | ........... B29C 64/209 |
| JP | 07029331 | | | 9/1988 | |
| JP | 2018130863 | A | | 8/2018 | |
| KR | 2015135567 | A | * | 12/2015 | ............. B29C 67/00 |
| KR | 20160080894 | A | | 7/2016 | |
| KR | 101769144 | B1 | | 8/2017 | |
| KR | 20180012432 | A | | 2/2018 | |
| KR | 101895151 | B1 | | 9/2018 | |
| KR | 2019062664 | A | * | 6/2019 | ........... B29C 64/118 |
| KR | 20190065622 | A | | 6/2019 | |
| KR | 2020053973 | A | * | 5/2020 | ............. B65G 33/20 |
| KR | 20200053973 | A | | 5/2020 | |
| KR | 102396630 | B1 | | 5/2022 | |
| WO | WO-2021040578 | A1 | * | 3/2021 | ........... B29C 64/209 |

OTHER PUBLICATIONS

Machine English translation of Hong S I et al. (KR20150135567A) (Year: 2015).*
Machine English translation of Kuk Youn Ho et al. (Ae W J et al.), (KR20190062664A); Retrieved from https://worldwide.espacenet.com/patent/search/family/066849813/publication/KR20190062664A?q=pn%3DKR20190062664A (Year: 2019 ).*
Machine English translation of KIM at al. (KR-2020053973-A) (Year: 2020).*
Machine English translation of CN-113564588-A (Xie et al.) (Year: 2021).*
Notice of Non-Final Rejection, dated Sep. 23, 2021, issued in Korean Application No. 2021-0081202, 4 pgs.
Notice of Allowance dated Apr. 8, 2022, issued in Korean Application No. 2021-0081202, 1 pgs.
International Search Report and Written Opinion dated Oct. 5, 2022, issued in corresponding International Application No. PCT/KR2022/008461, 7 pgs.
First Office Action, dated Nov. 15, 2023, issued in Chinese Application No. 2022800079073 (including English-language translation), 13 pages.

* cited by examiner

NOZZLE OF REINFORCING MATERIAL CO-PRINTING TYPE 3D PRINTER FOR CONSTRUCTION

TECHNICAL FIELD

The present disclosure relates to a 3D printer for construction for print-molding various structures, in which a main pipe 30 for transferring a filament material 31 therein is installed inside a nozzle 10 for discharging a printing material, such as concrete or mortar, to enable co-printing of the filament material 31 with the printing material while embedded in the printing material.

BACKGROUND ART

A 3D printer for construction is an apparatus for building a structure of a predetermined shape by linearly extruding and stacking a fluid material e.g., concrete or mortar, and as such can omit or minimize the mold construction process necessarily required in the conventional construction of concrete structures and may have a significant advantage in terms of formability, construction time and etc. and Korean Patent NO. 1895151 may be cited as a related prior art.

In addition to Korean Patent NO. 1895151, in a conventional 3D printer for construction as shown in FIG. 1, a fluid printing material such as concrete or mortar is linearly extruded via a nozzle 10 mounted on a movable body 20, and a structure is formed as the linearly extruded printed object is stacked and cured, and printing of a wall body is illustrated in FIG. 1 by way of example.

An object printed by a 3D printer for construction as described above basically has a form of a linear extrudate and a planned structure is formed as a linear extrudate is stacked along the moving path of a movable body 20 and a nozzle 10. Although the 3D printer illustrated in FIGS. 1 and 2 is configured such that the nozzle 10 for discharging a printing material is mounted on the movable body 20, wherein the movable body 20 is configured to make a horizontal reciprocating motion along a rail 92 liftably mounted on a gantry crane-type frame 90, other various schemes other than the aforementioned configuration that allow free movement of the movable body 20 mounted with the nozzle 10, e.g., a jib crane, may be applied.

DISCLOSURE

Technical Problem

As described above, an object printed by a 3D printer for construction can be basically regarded as a fluid linear extrudate. Such fluid materials, e.g., concrete or mortar, as shown in FIGS. 1 and 2 may be supplied from the outside of the 3D printer via a supply pipe 95 and discharged through a nozzle 10 by various pressurizing means while being loaded in a hopper 15, and given the operating structure of the 3D printer for construction, it is practically impossible to embed an additional reinforcing material in the printing material discharged via the nozzle 10.

In the traditional concrete structures formed by pouring concrete in a mold, the pouring of fluid concrete is carried out while a reinforcing material, such as a reinforcing bar or a steel frame, is inserted inside the mold, which allows the concrete and the reinforcing material to mechanically behave as a high-strength composite material in which they are firmly attached to each other, and it is thus possible to reduce the cross-sectional area of each member constituting the structure and resolve the disadvantage of concrete of having a relatively low tensile strength compared to compressive strength.

On the other hand, exclusion of molds in concrete structures formed by a 3D printer for construction makes embedding of standardized reinforcing materials fundamentally impossible, and the method of introducing a mixed material in a short fiber form during the initial blending of printing material is in limited use.

There are thus limitations to substantial reinforcement of a printed object of a 3D printer for construction, e.g., increase of tensile strength and crack inhibition, and such limitations acted as an obstacle to securing constructability and expanding application of a 3D printer for construction.

Technical Solution

To address the aforementioned issues, the present disclosure provides a nozzle of a reinforcement material co-printing type 3D printer for construction, and in particular, a nozzle 10 of a 3D printer for construction wherein a main pipe 30 parallel to the nozzle 10 is embedded in the nozzle 10, the main pipe 30 being a hollow pipe body with a transfer hole 33 formed in an axial direction therein, and an exposed pipe 36 as a pipe body with the transfer hole 33 formed in an axial direction therein and exposed outside the nozzle 10 is formed, wherein the other end of the main pipe 30 at a distal end of the nozzle 10 is connected to the exposed pipe 36, such that as a filament material 31 introduced into the transfer hole 33 of the exposed pipe 36 is discharged from an end of the main pipe 30 at the distal end of the nozzle 10 via the main pipe 30, the filament material 31 may be co-printed with a printing material while embedded in the printing material.

In addition, a nozzle of a reinforcement material co-printing type 3D printer for construction may be characterized in that a rotable body 40 configured to be freely rotatable about the main pipe 30 is mounted on the main pipe 30, and a plurality of agitating blades 45 inclined relative to the main pipe 30 are radially formed around the main pipe 30 on an outer circumferential surface of the rotable body 40, such that as a fluid printing material is discharged via the nozzle 10, the agitating blades 45 and the rotable body 40 rotate around the main pipe 30 as an axis. The nozzle of reinforcement material co-printing type 3D printer for construction may be further characterized in that on an inner circumferential surface of the nozzle 10 between the agitating blades 45 and a distal end of the nozzle 10, a plurality of fixed blades 47 parallel to a central axis of the nozzle 10 are radially formed around the central axis of the nozzle 10.

In addition, the nozzle of a reinforcement material co-printing type 3D printer for construction may be characterized in that a rotable pipe 60 as a pipe body co-axial with the nozzle 10 may be installed at a distal end of the nozzle 10 in a freely-rotatable manner about a central axis of the nozzle 10, and a plurality of agitating blades 45 inclined relative to the central axis of the nozzle 10 are radially formed around the central axis of the nozzle 10 on an inner circumferential surface of the rotable pipe 60, such that a fluid printing material is discharged via the nozzle 10, the agitating blades 45 and the rotable pipe 60 rotate around the central axis of the nozzle 10. The nozzle of a reinforcement material co-printing type 3D printer for construction may be further characterized in that a fixed pipe 70 as a pipe body co-axial with the rotable pipe 60 may be installed at a distal end of the rotable pipe 60, and a plurality of fixed blades 47 parallel to a central axis of the nozzle 10 are radially formed around the central axis of the nozzle 10 on an inner circumferential surface of the fixed pipe 70, wherein the fixed pipe 70 and the nozzle 10 are connected by a restricting member 71.

Advantageous Effects

According to the present disclosure, in constructing a structure by a 3D printer for construction, a printing material embedded with the filament material 31 as a reinforcing material may be printed, and as a result, the effects of reinforcing tensile strength of the printed object and inhibiting crack of the printed object may be obtained.

In particular, materials that are inapplicable to a conventional 3D printer for construction, such as a continuous embedded-type filament material 31 and a filament material 31 as a steel material etc. may be freely applied so as to enable substantial and significant structural reinforcement of the printed object.

Accordingly, using the 3D printer for construction disclosed herein, structures having various forms and mechanical configurations may be constructed, thus increasing the utilization of the 3D printer for construction and invigorating the relevant industries.

EXPLANATION OF REFERENCE NUMERALS DESIGNATING THE MAJOR ELEMENTS OF THE DRAWINGS

10: NOZZLE
15: HOPPER
19: INPUT PIPE
20: MOVABLE BODY
30: MAIN PIPE
31: FILAMENT MATERIAL
33: TRANSFER HOLE
34: CURVED PIPE
36: EXPOSED PIPE
39: BRACKET
40: ROTABLE BODY
45: AGITATING BLADE
47: FIXED BLADE
51: DRIVING PULLEY
52: SUPPORT PULLEY
53: GUIDE PULLEY
54: ALIGNMENT ROLLER
56: BOBBIN
57: TRANSFER MOTOR
60: ROTABLE PIPE
66: DRIVEN GEAR
67: DRIVING GEAR
68: DRIVING MOTOR
69: COUNTERWEIGHT
70: FIXED PIPE
71: RESTRICTING MEMBER
90: FRAME
92: RAIL
95: SUPPLY PIPE

MODE FOR INVENTION

The configuration and mechanism of the present disclosure will be described in detail with reference to the accompanied drawings below.

Figure 1:
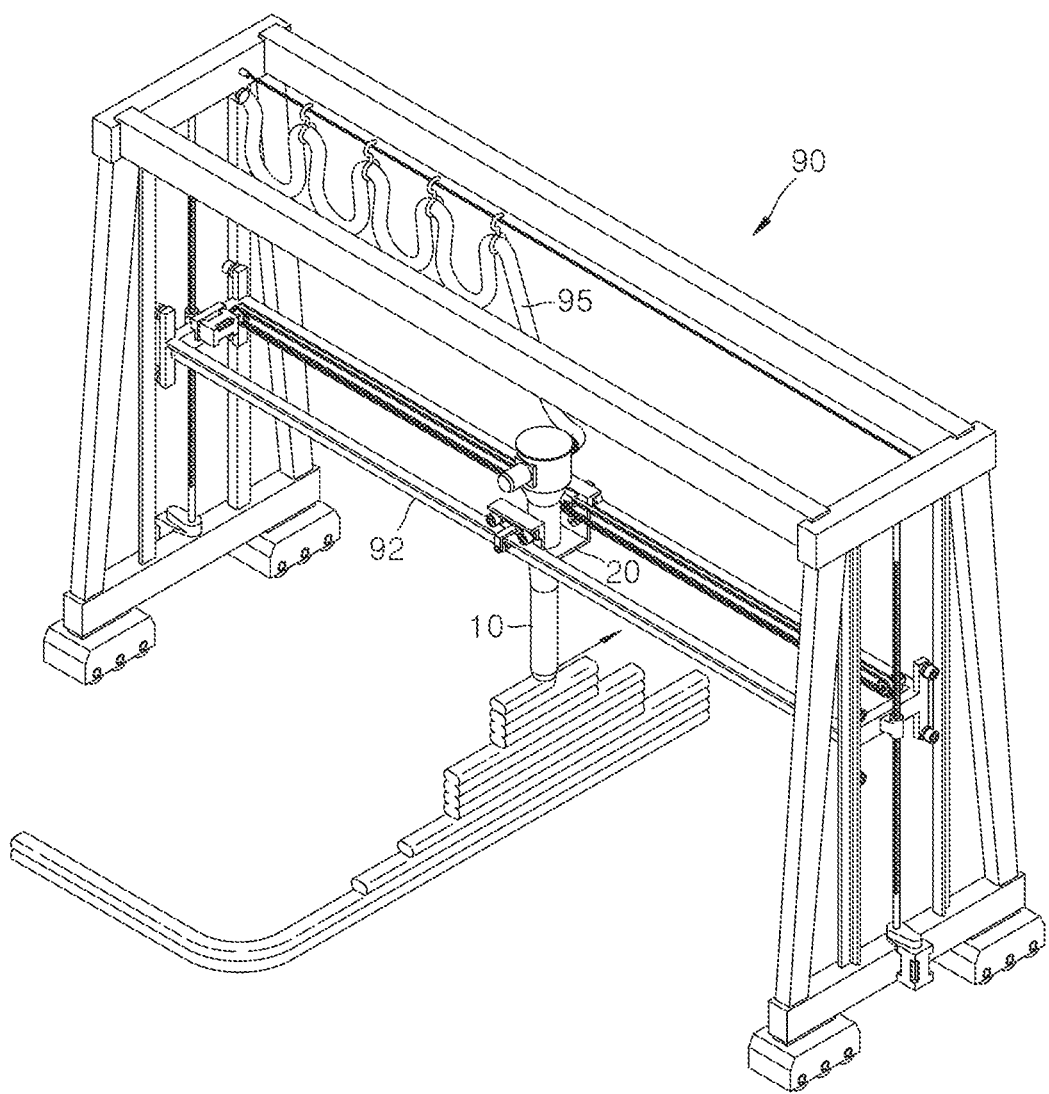
FIG. 1 illustrates an example of a 3D printer for construction in a prior art.
Figure 2:
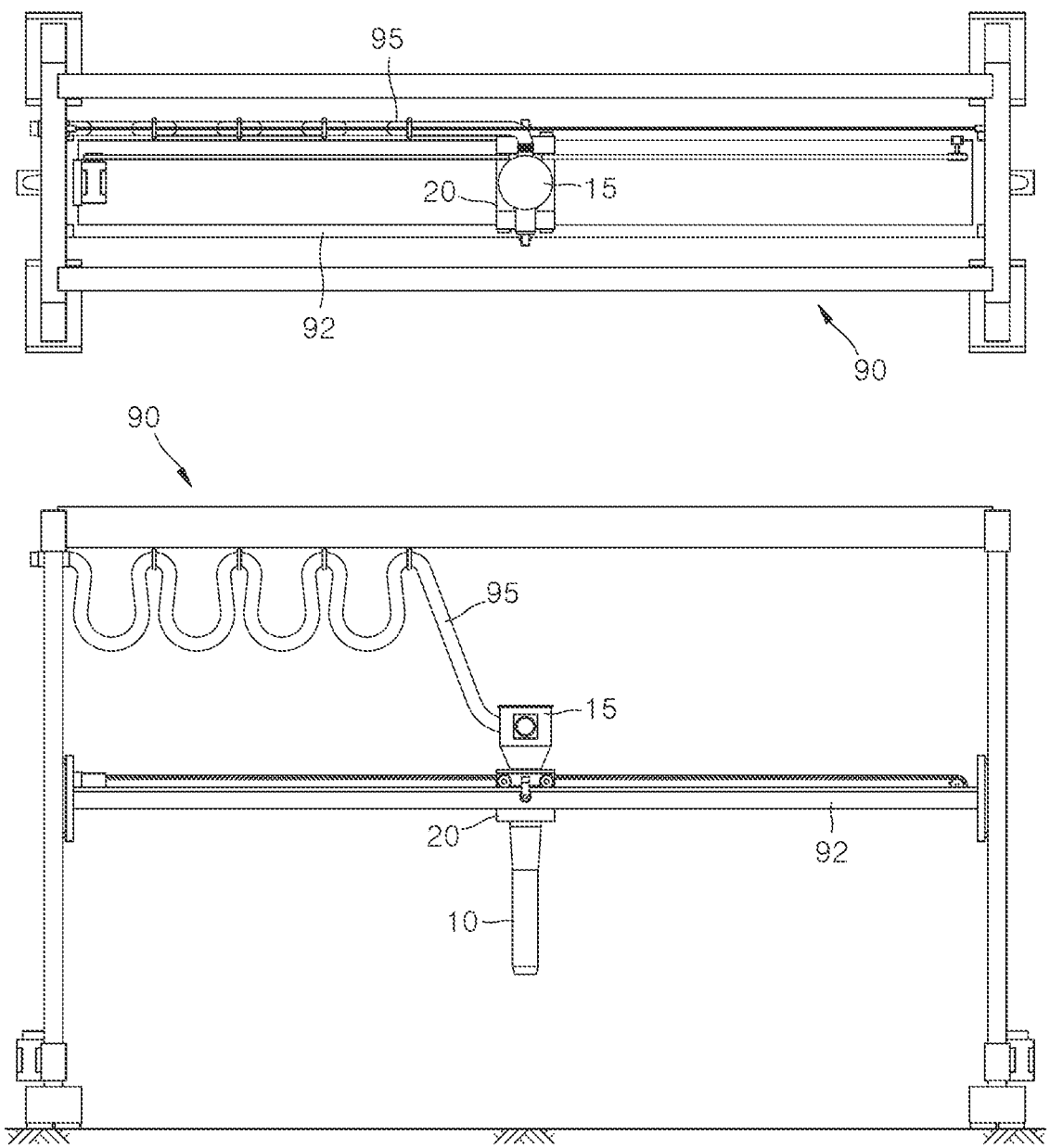
FIG. 2 is a front view and a plan view of a 3D printer for construction in a prior art.

First, FIGS. 1 and 2 show an overall configuration of a typical 3D printer for construction, and the 3D printer for construction illustrated in the drawings shows that a elevating type rail 92 is configured on a gantry crane-type frame 90, and a lateral reciprocating motion of a movable body 20 along this rail 92 causes the movable body 20 and the nozzle 10 to move.

In particular, the self-propelled gantry crane-type frame 90 may be applied as a basic framework of the 3D printer, wherein forward and backward motions of the self-propelled frame 90 in a longitudinal direction give a forward motion or a backward motion to the movable body 20 mounted with the nozzle 10, vertical movement of the movable body 20 is carried out by the rail 92 liftably mounted on the frame 90, and as the movable body 20 travels along the rail 92 in a lateral direction, left movement or right movement of the nozzle 10 is carried out.

This three-dimensional moving mechanism of the movable body 20 mounted with the nozzle 10 may be applied to the present disclosure as well. The examples illustrated in FIGS. 1 and 2 show a self-propelled gantry crane-type moving mechanism; however, as described above, cranes of various types, i.e., a jib crane, as well as various means of movement enabling three-dimensional movements of the nozzle 10 may be used.

Figure 3:
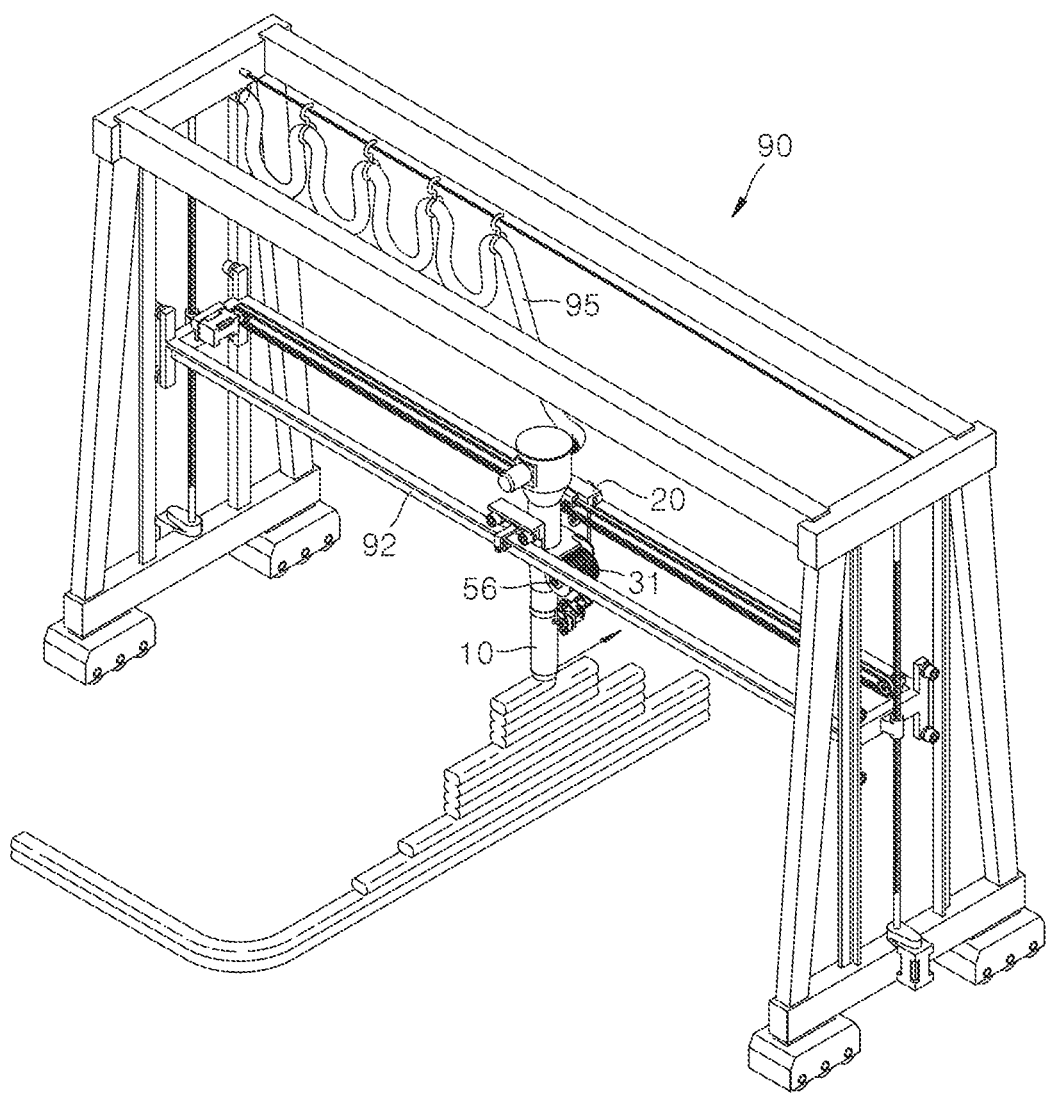
FIG. 3 is a perspective view of a 3D printer for construction disclosed herein.
Figure 4:
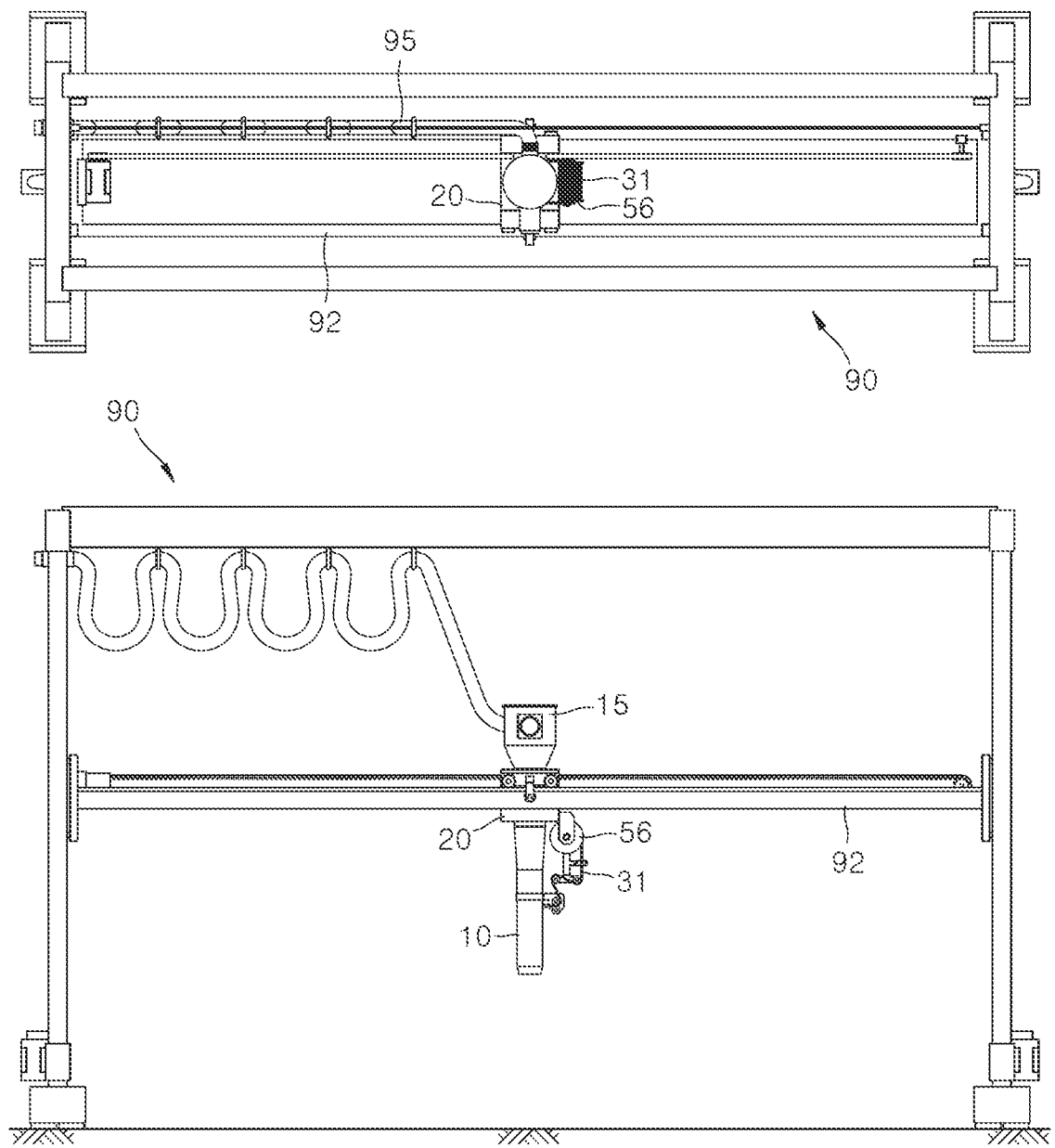
FIG. 4 is a front view and a plan view of a 3D printer for construction disclosed herein.

Illustrated in FIGS. 3 and 4 by way of example is an overall configuration of a 3D printer for construction disclosed herein. Although the 3D printer for construction disclosed herein as depicted in the drawings also utilizes a gantry crane-type frame 90, other various movement means enabling 3D movement of the nozzle 10 may be applied. Further as depicted in the same drawings, on a nozzle 10 or on a movable body 20 mounted with the nozzle 10, a component such as a bobbin 56, capable of supplying a filament material 31 as a reinforcing material to the nozzle 10 may be mounted.

Figure 5:
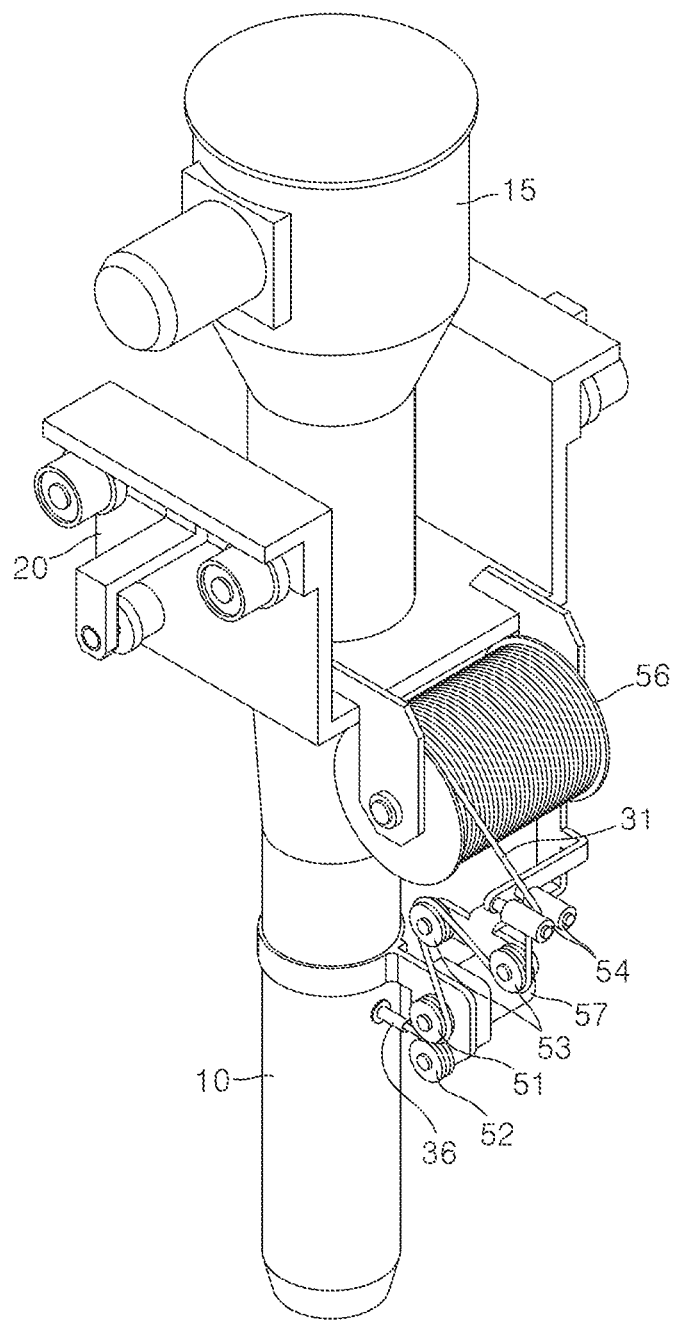
FIG. 5 is a perspective view of the present disclosure.

As shown in FIG. 5, which is a perspective view of external appearances of a nozzle 10, a movable body 20, etc. disclosed herein, the nozzle 10 and the movable body 20 may be mounted with a plurality of pulleys for continuously supplying a filament material 31 into the nozzle 10, a bobbin 56 on which the filament material 31 is wound and loaded, a transfer motor 57 for imparting an axial transfer force to the filament material 31, and the like.

Figure 6:
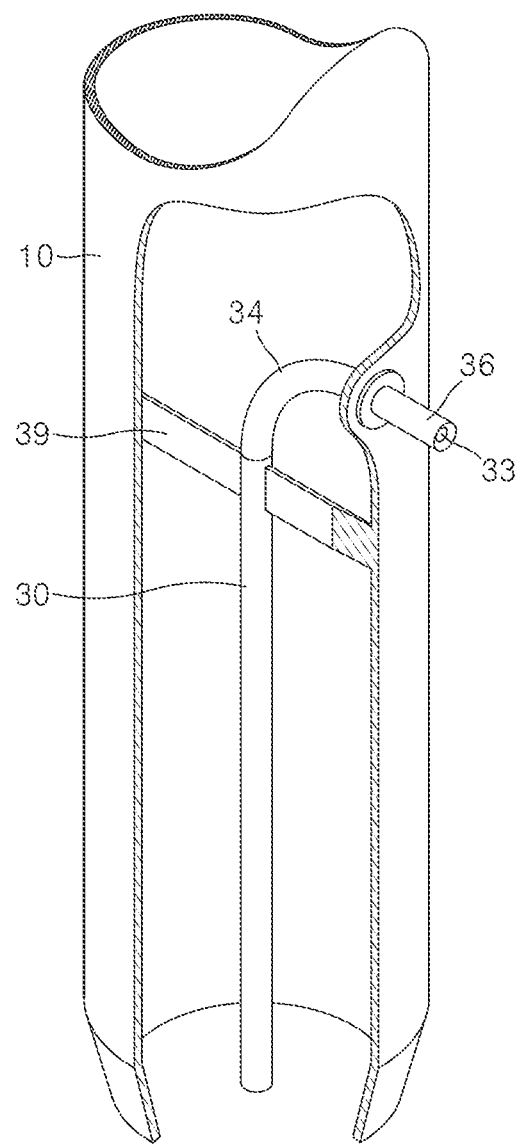
FIG. 6 is a partially-cut perspective view of a main part of the present disclosure.
Figure 7:
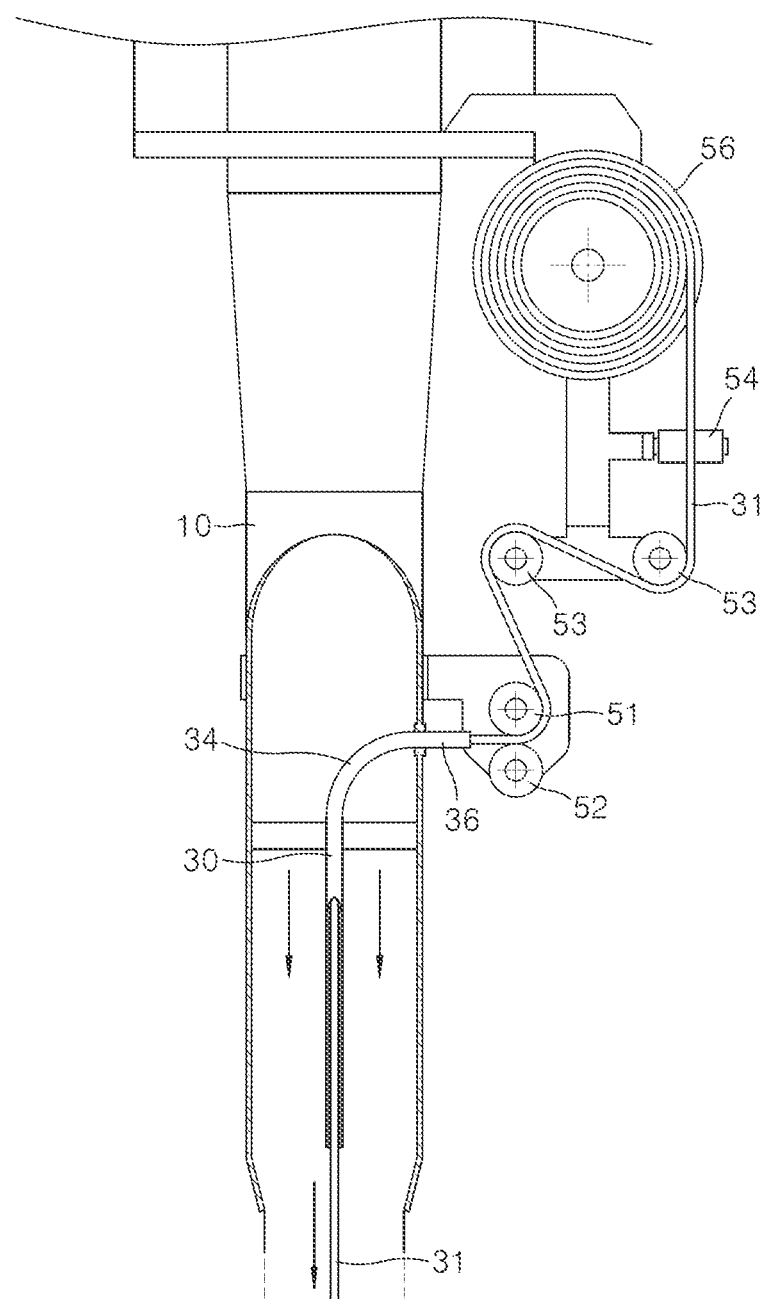
FIG. 7 is a cross-sectional view of an operating state of the present disclosure.

That is, as shown in FIGS. 6 and 7 showing an internal structure and an operating state of the present disclosure, in the nozzle 10 of a 3D printer for construction, the main pipe 30 parallel to the nozzle 10 may be embedded in the nozzle 10 wherein the main pipe 30 is a hollow pipe body having a transfer hole 33 formed in an axial direction therein and includes an exposed pipe 36 as a pipe body exposed outside the nozzle 10 and having the transfer hole 33 formed in an axial direction therein, wherein the other end of the main pipe 30 at the distal end of the nozzle is connected to the exposed pipe 36.

Therefore, as shown in FIG. 7, as the filament material 31 introduced into the transfer hole 33 of the exposed pipe 36 is discharged from the distal end of the nozzle 10 of the main pipe 30 via the main pipe 30, the filament material 31 may be co-printed with the printing material while embedded therein.

According to the present disclosure, as the filament material 31 co-printed with the printing material, linear reinforcing materials of various materials may be applied, such as various metal-based filament materials 31 such as a steel filament, high-strength synthetic resin-based filament materials 31, carbon fiber-based filaments 31, and the like.

Accordingly, as the printing material is cured with a reinforcing material, i.e., the filament material 31 embedded in and attached to the printing material, a reinforcing effect as observed in a reinforcing material-embedded concrete, i.e., reinforced concrete, may be obtained. Moreover, as tensile strength of the printed object increases and cracking of the printed object is suppressed, improvement in the structural stability and durability of a structure constructed with a printed object of a 3D printer for construction may be achieved.

That is, the present disclosure is characterized in that a reinforcement filament 31 is embedded inside a linear printed object of a 3D printer for construction by utilizing a main pipe 30 embedded in an axial direction in a nozzle 10, thereby achieving a dramatic improvement in strength and durability of the printed object.

As shown in FIGS. 6 and 7, an end of the main pipe 30, which is a hollow pipe body, at a distal end of the nozzle 10, may be open and discharge the transferred filament material 31 therefrom, and the other end of the main pipe 30 at the other distal end of the nozzle 10 may be connected to the exposed pipe 36 outside the nozzle 10 via a curved pipe 34 such that as the filament material 31 is transferred via the exposed pipe 36, the curved pipe 34, and the transfer hole 33 formed in the main pipe 30, the filament material 31 may be discharged from the distal end of the main pipe 30, and through a configuration as shown in FIG. 5 and FIG. 7, the filament material 31 may be continuously supplied to the exposed pipe 36.

In such continuous supply of the filament material 31, a means for continuously supplying the filament material 31 may be mounted on the nozzle 10 or the movable body 20, wherein such continuous supply means may be configured with a plurality of pulleys, a transfer motor 57, a bobbin 56 with the filament material 31 wound thereon, etc. as described above.

As shown in FIGS. 5 and 7, a driving pulley 51 and a support pulley 52 installed at the entrance of the exposed pipe 36 are rotated in a reverse direction from each other, thereby continuously supplying the filament material 31 to the transfer hole 33 of the exposed pipe 36. As shown in FIG. 5, a transfer motor 57 may be connected to the driving pulley 51, and as the transfer motor 57 is operated, the driving pulley 51 may be rotated, thereby continuously introducing the filament material 31, which rotates in close contact with the driving pulley 51, into the exposed pipe 36.

In addition, regarding the filament material 31 moving between the driving pulley 51 and the support pulley 52, the outer circumferential surface of the filament material 31 remains compressed simultaneously by the driving pulley 51 and the support pulley 52. Thus, rotation of the driving pulley 51 by the transfer motor 57 and movement of the filament material 31 brings the support pulley 52 in a freely-rotating state into rotation in the opposite direction to the direction of rotation of the driving pulley 51, thereby pressing the filament material 31 and creating a compressed state between the driving pulley 51 and the filament material 31, and as a result, the rotational force of the driving pulley 51 may be fully converted to an axial transfer force of the filament material 31.

Figure 9:
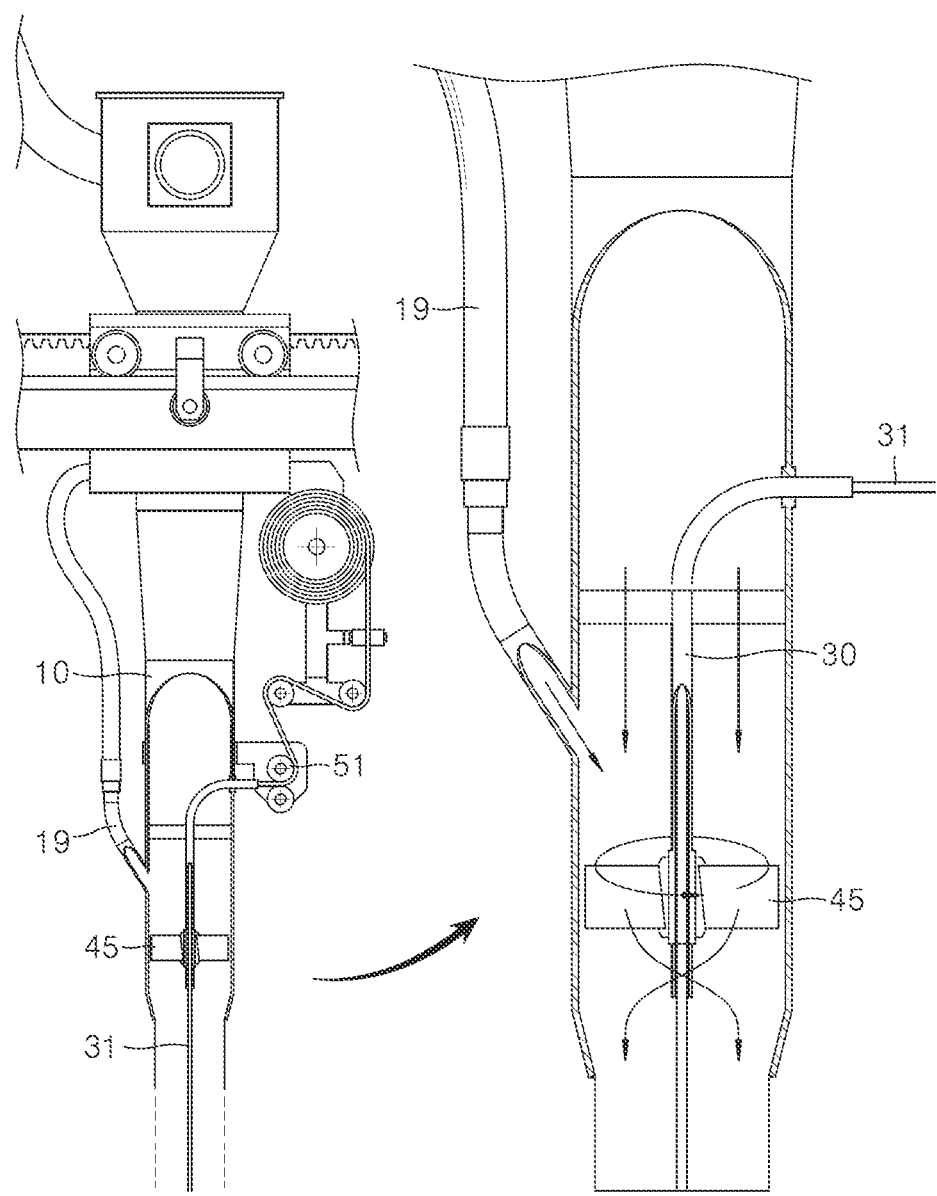
FIG. 9 is a cross-sectional view of an operating state of the embodiment depicted in FIG. 8.
Figure 10:
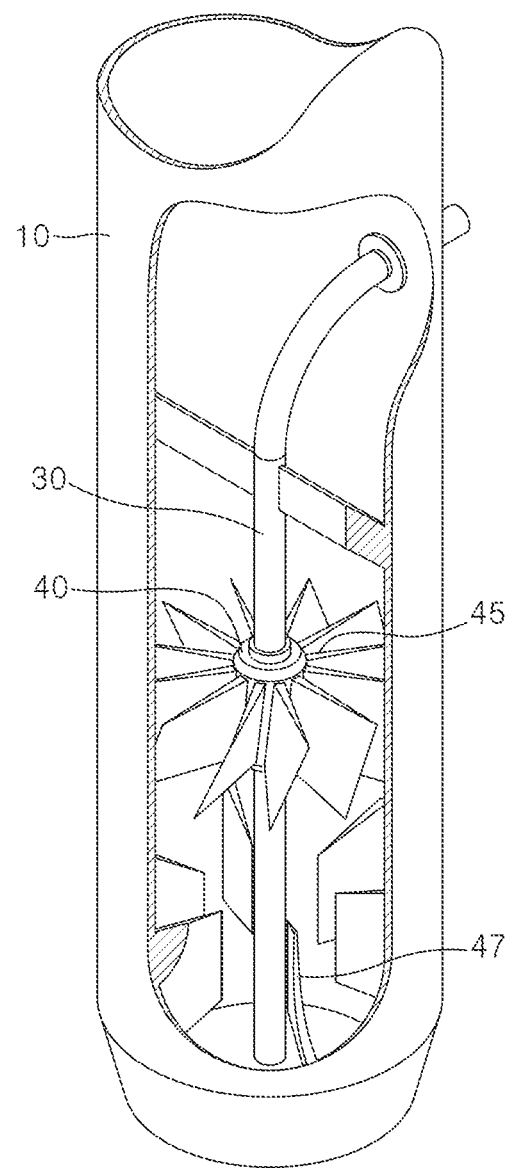
FIG. 10 is a partially-cut perspective view of a main part of an embodiment of the present disclosure including agitating blades and fixed blades.

In the embodiment in FIGS. 9 and 10, the bobbin 56 on which the filament material 31 is wound may be mounted on the movable body 20; however, the bobbin 56 may be mounted on top of the nozzle 10, or a plurality of guide pulleys 53 in a freely rotatable state may be installed between the bobbin 56 and the driving pulley 51, thereby imparting an appropriate tension to the filament material 31 released from the bobbin 56 and entering between the driving pulley 51 and the support pulley 52. In addition, an alignment roller 54 installed around the bobbin 56 serves to align and guide the filament material 31 released from the bobbin 56 so as to allow the filament material 31 to stably enter to the guide pulley 53.

Accordingly, throughout the entire path of releasing and introducing the filament material 31 between the bobbin 56 and the exposed pipe 36, stable transfer of the filament material 31 may be possible without excessively fast release or release delay. In addition, as the driving pulley 51 and the filament material 31 stay tightly compressed against each other, rotation of the driving pulley 51 and transfer of the filament material 31 closely interact with each other, thereby enabling a precise control over the feed speed of the filament material 31 through control of the rotation speed of the transfer motor 57.

Through such precise control of the transfer speed of the filament material 31, it is possible to control such that the printing material and the filament material 31 be discharged precisely at the same speed when transferring of the filament material 31 and discharging of the printing material are carried out simultaneously. Accordingly, it may be possible to manage the state of the filament material 31 embedded in the printed object in an accurate and reliable manner.

Meanwhile, in the nozzle 10 for a 3D printer for construction disclosed herein as shown in FIGS. 8 to 17, the filament material 31 is not simply co-printed with the printing material having the filament material 31 embedded therein, but by performing agitation on the printing material right before discharging the fluid printing material via the nozzle 10, structural performance of the printed object may be improved while suppressing material segregation, details of which will be further described as follows.

First, illustrated in FIGS. 8 to 11 is an embodiment to which rotating-type agitating blades 45 are applied. In particular, a rotable body 40 freely rotatable about the main pipe 30 embedded in the nozzle 10 and parallel to the nozzle 10 may be installed, wherein a plurality of agitating blades 45 inclined relative to the main pipe 30 are formed radially about the main pipe 30 on an outer circumferential surface of the rotable body 40. Here, the main pipe 30 is illustrated in the drawings as being concentric and co-axial with the nozzle 10, and the other end of the main pipe 30 at the distal end of the nozzle 10 may be fixed to an inner circumferential surface of the nozzle 10 via a bracket 39, etc.

Figure 8:
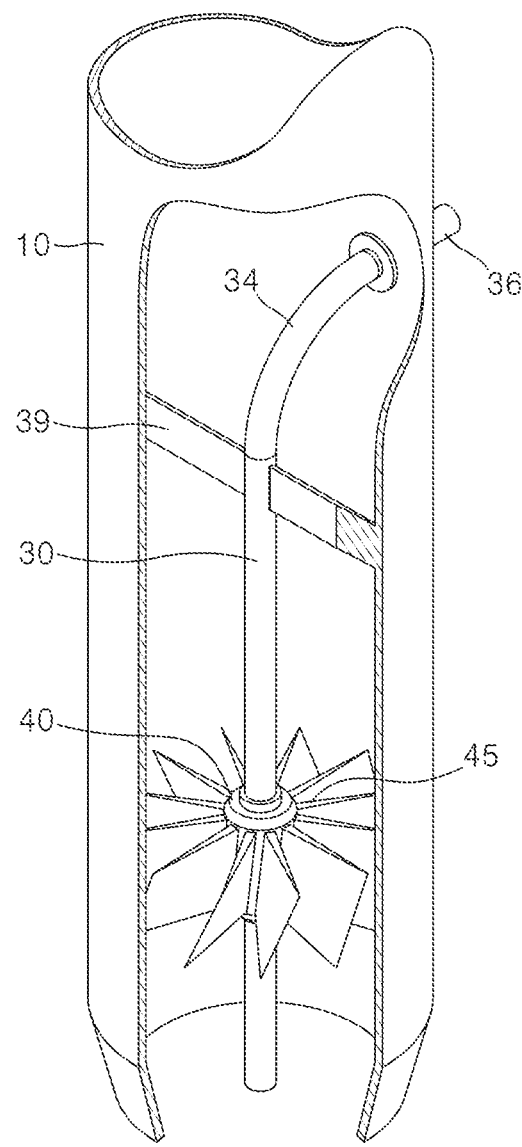
FIG. 8 is a partially-cut perspective view of a main part of an embodiment of the present disclosure including agitating blades.

In addition, the end of the main pipe 30 at the distal end of the nozzle 10, that is, the rotable body 40 coupled to the lower end of the main pipe 30 in the drawing, may be freely rotated around the main pipe 30 and coupled in a manner that restricts separation from the main pipe 30. As shown in FIG. 8, on the outer circumferential surface of the rotable body 40, a plurality of inclined agitating blades 45 may be arranged radially and in an equiangular manner around the main pipe 30.

Accordingly as shown in FIG. 9, during the process of pumping and discharging a fluid printing material via the nozzle 10, the inclined agitating blades 45 and the rotable body 40 may be rotated without an additional power, and during this process, the fluid printing material passing through the agitating blades 45 may be agitated, allowing a mixture of various particles constituting the fluid printing material to be homogeneously mixed.

Meanwhile, in the embodiment shown in FIG. 9, an input pipe 19 may be connected to the nozzle 10 wherein an additive is introduced into a fluid printing material inside the nozzle 10. Here, the additive introduced into the distal end of the nozzle 10 may be, for example, a curing accelerator for inducing rapid curing of the discharged printing material, and such addition of an additive may be applied to the nozzle 10 of the present disclosure to achieve a further improvement.

Since when constructing a structure using a 3D printer for construction, rapid curing of a fluid printing material discharged via a nozzle 10 is critical to ensuring construction efficiency as well as stability of the structure and operation safety, a curing accelerator for the fluid printing material may be added. Here, if the curing accelerator is added during the very first compounding of materials or during the process of transferring the fluid printing material such as a hopper 15, transfer of the fluid printing material may fail due to excessively rapid solidification of the materials. Therefore, there may be a need to add a curing accelerator at the final discharge end of the nozzle 10.

However, since there is no means of substantial agitation inside a nozzle 10 in a prior art, the added curing accelerator may fail to be uniformly mixed with the fluid printing material but rather remains concentrated on the surface portion thereof. This may not only result in a decrease in the effect of the added curing accelerator, but also cause differential curing and material segregation, critically undermining the stability and durability of the entire structure.

On the other hand, in the present disclosure as shown in FIG. 9, even when an additive such as a curing accelerator is introduced through an input pipe (19) connected to the distal end of the nozzle 10, the additive introduced can be mixed uniformly with the fluid printing material subsequently by the agitating blades 45. As a result, the purpose of addition of an additive may be fully achieved, and adverse side effects such as differential curing and material segregation may be avoided. In particular, given the fact that the printing material of the present disclosure contains a reinforcing filament material 31 embedded therein, there is a need for an additive such as a curing accelerator to sufficiently penetrate to the core of the printing material. Hence, the effect achieved by agitating a fluid printing material can be particularly beneficial in the context of the present disclosure.

Accordingly, by embedding freely rotating agitating blade 45 in the distal end of the nozzle 10 of a 3D printer for construction, sufficient agitation may be performed immediately before the final discharge of the fluid printing material. However, during the rotational agitation process of a printing material, if an excessive rotational force is applied to the printing material being discharged, the discharged shape of the printing material and interlayer adhesion of linear printed objects may be adversely affected.

Figure 11:
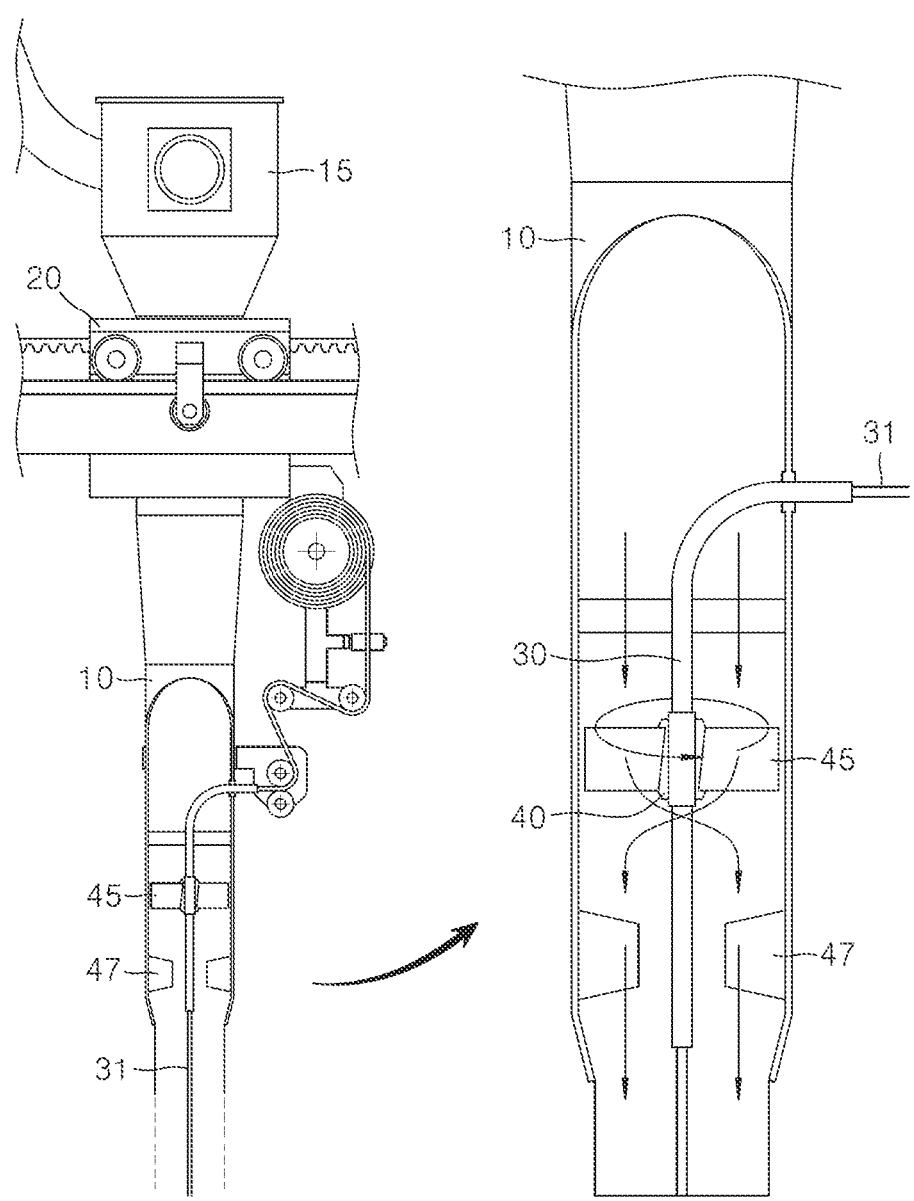
FIG. 11 is a cross-sectional view of an operating state of the embodiment depicted in FIG. 10.

In this context, as a means for aligning the printing material with an imparted rotational force right before being departed from the nozzle 10, as shown in FIG. 10 and FIG. 11, a plurality of fixed blades 47 parallel to the central axis of the nozzle 10 are radially formed around the central axis of the nozzle 10 on the inner circumferential surface of the nozzle 10 between the agitating blades 45 and the distal end of the nozzle 10.

Accordingly as shown in FIG. 11, the fluid printing material, primarily agitated by the agitating blades 45, may be realigned while passing through the fixed blades 47. Here, no material segregation occurs while the primarily agitated fluid printing material is realigned, and this may be attributed to the fact that while the fluid printing material with an imparted rotational force passes through the fixed blades 47, a relative effect of reverse-rotation generates, thereby resulting in the same or similar effect achieved by performing agitation again in a reverse direction.

As such, in the embodiment of FIGS. 10 and 11, the agitating blades 45 and the fixed blades 47 perform a complementary role to each other, which achieves a sufficient agitating action inducing homogeneous mixing among materials while preventing unnecessary rotations of the finally discharged printing material. In particular, through final alignment of the printing material, much tighter attachment between the filament material 31 and the printing material may also be achieved.

As such, by joining the rotable body 40 provided with the agitating blades 45 to the main pipe 30, a reinforcement effect by an embedded filament material 31 may be obtained, and material segregation may be prevented and construction quality ensured by agitation of the printing material. However, due to expansion of components embedded in the nozzle 10, such as the rotable body 40, there may be issues such as a decreased cross-sectional area of the nozzle 10 and hindered pumping of the fluid printing material.

Accordingly in the present disclosure, a rotable pipe 60 is configured so as to ensure a sufficient agitating action for a fluid printing material while preventing pumping resistance of the nozzle 10 by excluding components related to the rotable body 40 installed in the main pipe 30 to encroach the cross-sectional area of the central portion of the nozzle 10. Embodiments relevant thereto are illustrated in FIGS. 12 to 17.

Figure 12:
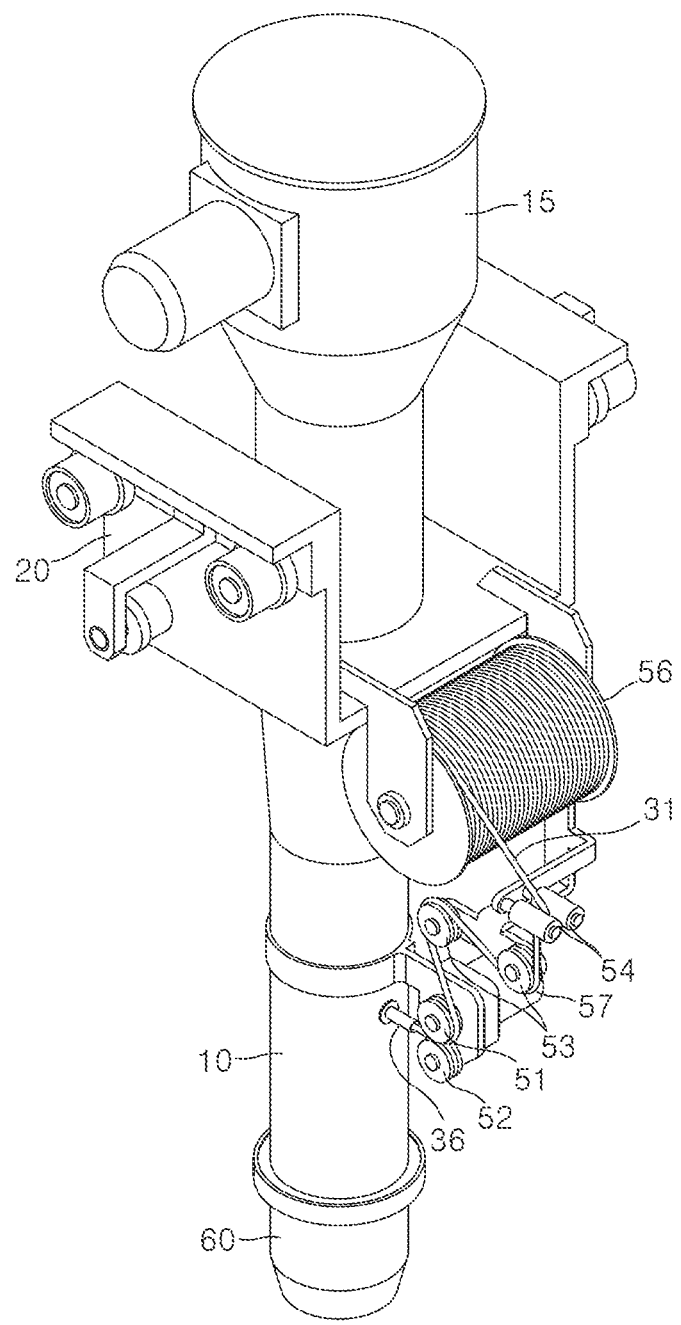
FIG. 12 is a perspective view of an embodiment of the present disclosure including a rotable pipe.
Figure 13:
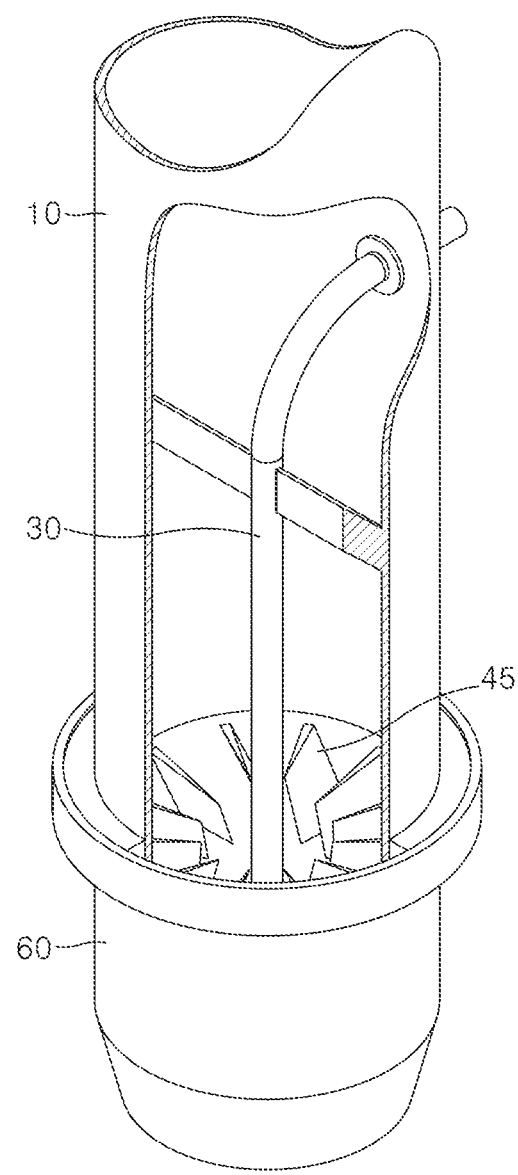
FIG. 13 is a partially-cut perspective view of a main part of the embodiment depicted in FIG. 12.
Figure 14:
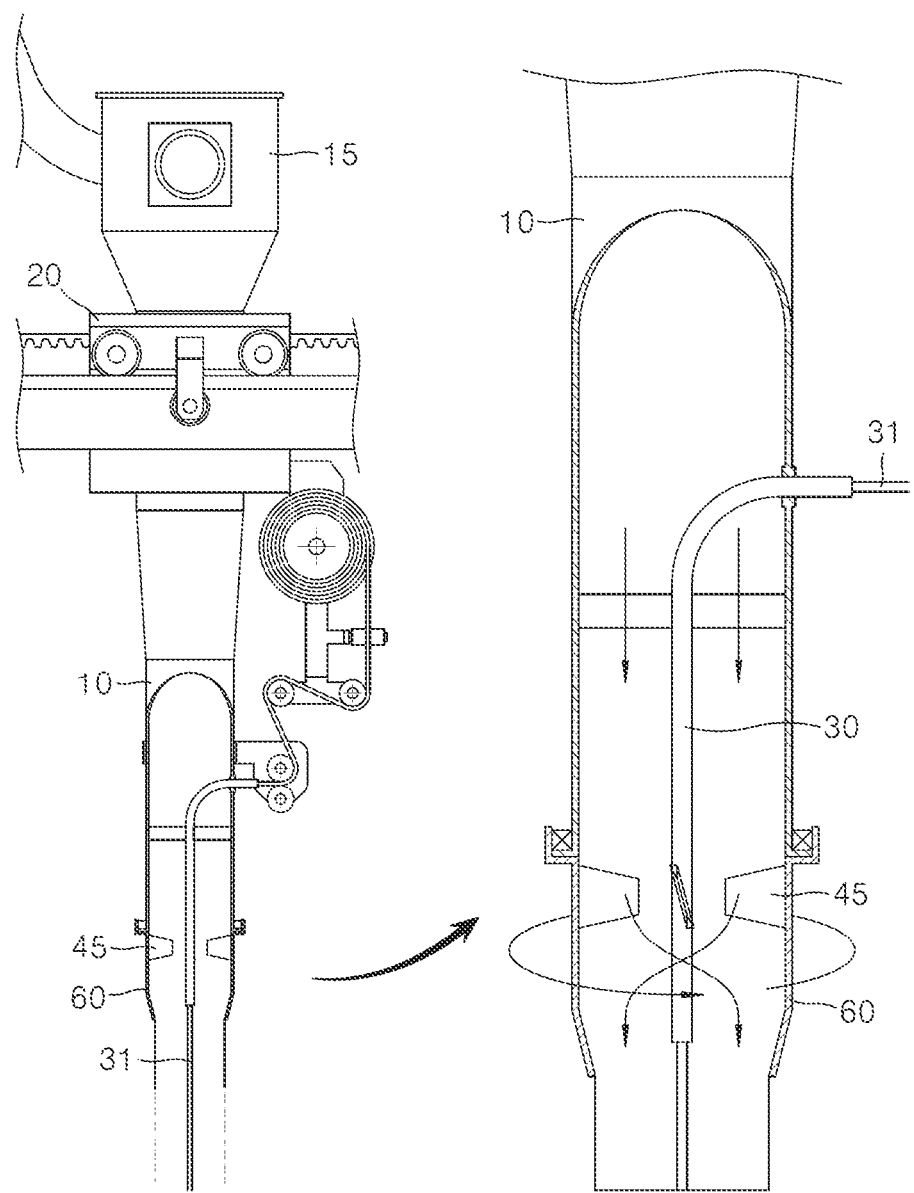
FIG. 14 is a cross-sectional view of an operating state of the embodiment depicted in FIG. 12.

First, illustrated in FIGS. 12 to 14 is an embodiment in which a freely-rotating rotable pipe 60 is mounted at a distal end of a nozzle 10 of a 3D printer for construction. As shown in FIG. 12, at the distal end of the nozzle 10, the rotable pipe 60 as a pipe body co-axial with the nozzle 10 may be installed so as to be rotatable around the central axis of the nozzle 10. As shown in FIG. 13, a plurality of agitating blades 45 inclined relative to a central axis of the nozzle 10 are formed radially around the central axis of the nozzle 10 on the inner circumferential surface of the rotable pipe 60, such that as shown in FIG. 14, as a fluid printing material is discharged via the nozzle 10, the agitating blades 45 and the rotable pipe 60 are rotated around the central axis of the nozzle 10.

The rotable pipe 60 coupled to a lower end of the nozzle 10 in a freely-rotating manner is a pipe body with two open ends, wherein the nozzle 10 and the rotable pipe 60 are connected to each other co-axially and concentrically. Although no reference numeral is given in the drawings, an annular bearing or the like may be provided to connect a pipe wall portion of the nozzle 10 and a pipe wall portion of the rotable pipe 60.

The agitating blades 45 protruded towards the center of the rotable pipe 60 from the inner circumferential surface of the rotable pipe 60 are inclined relative to the central axis of the rotable pipe 60, wherein a plurality of agitating blades 45 are arranged radially on a cross-section of the rotable pipe 60, a plan view of which is shown in the drawings.

Accordingly, facilitated rotation of the agitating blades 45 and facilitated agitation of the fluid printing material may be made possible even when shaft-related components encroaching the central portion of a cross-section of the nozzle 10 are completely excluded.

Figure 15:
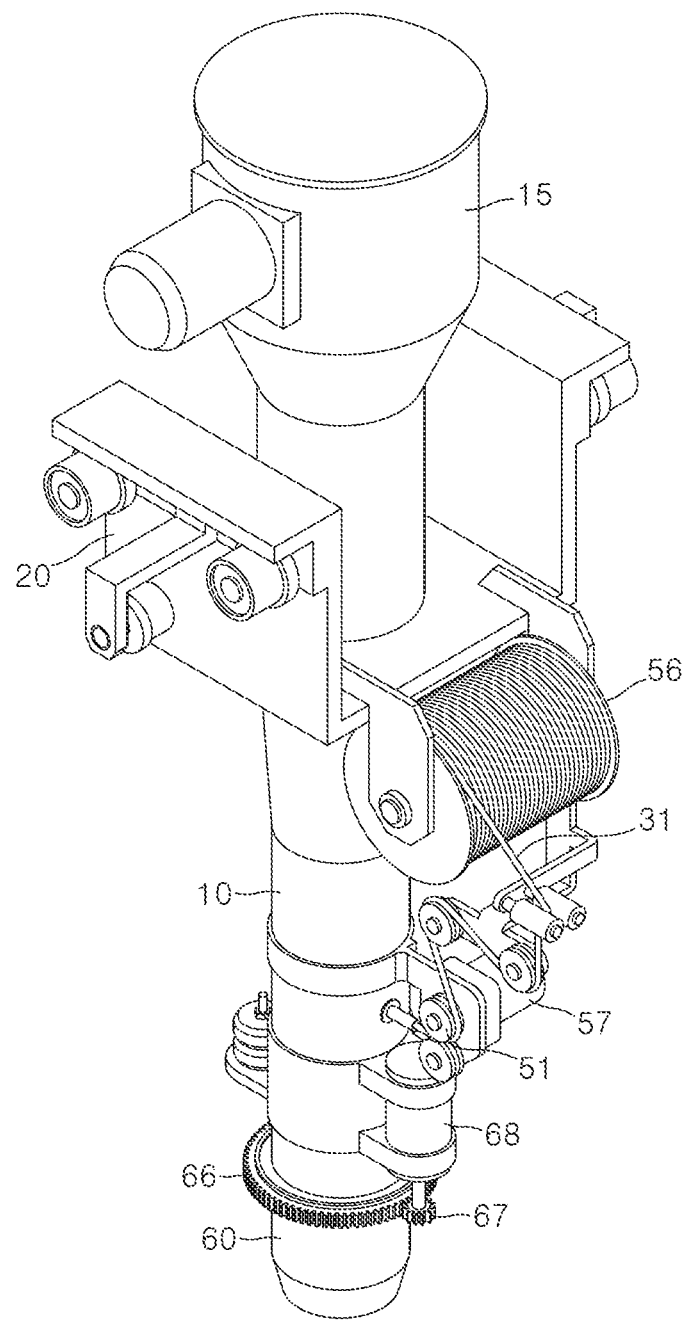
FIG. 15 is a perspective view of an embodiment of the present disclosure including a motorized type rotable pipe.
Figure 16:
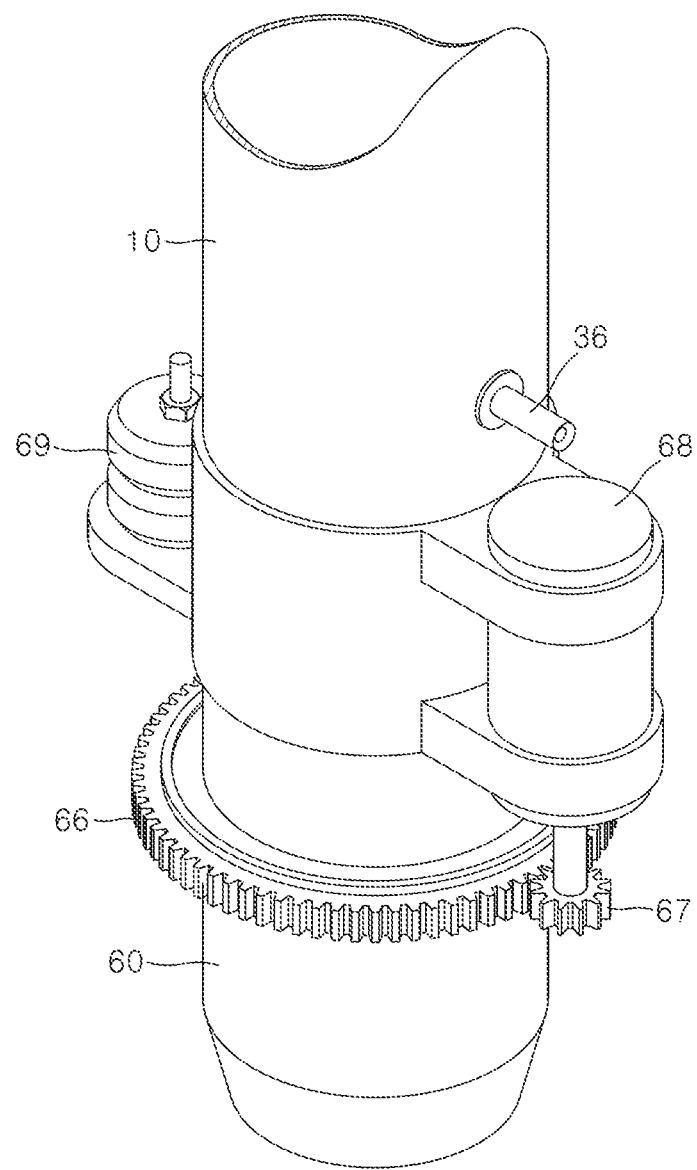
FIG. 16 is a perspective view of a main part of the embodiment in FIG. 15.

In particular, as shown in FIGS. 15 and 16, by installing a driven gear 66 on the outer circumferential surface of a rotable pipe 60 and installing a driving gear 67 being engaged therewith, and by connecting the driving gear 67 to a driving motor 68 affixed to a nozzle 10, forced rotation and forced agitation of the rotable pipe 60 may be possible, and as a result, agitation that is more robust than free-rotation of agitating blades 45 may be possible.

In such an embodiment of a motorized type rotable pipe 60, a driving motor 68 driving the driven gear 66 may be mounted on a nozzle 10 right above the rotable pipe 60, wherein a counterweight 69 planarly symmetric to the driving motor 68 may be provided to maintain a balance when moving a nozzle 10 of a 3D printer for construction and to mitigate drive shock of the driving motor 68.

Meanwhile, even in the nozzle 10 to which agitating blades 45—embedded rotable pipe 60 is applied, while agitating a printing material by rotation, an excessive rotational force may be imparted to the printing material being discharged. In this case, the discharged shape of the printing material and bonding between layers of linear printed objects may be adversely affected.

However, unlike the agitating blades 45—rotating type embodiment described above, a rotable pipe 60—applied embodiment has the rotable pipe 60 installed at a distal end of a nozzle 10, and thus may have a disadvantage in that a stationary pipe body or fixed blades 47 cannot be configured at a distal end of the nozzle 10.

Figure 17:
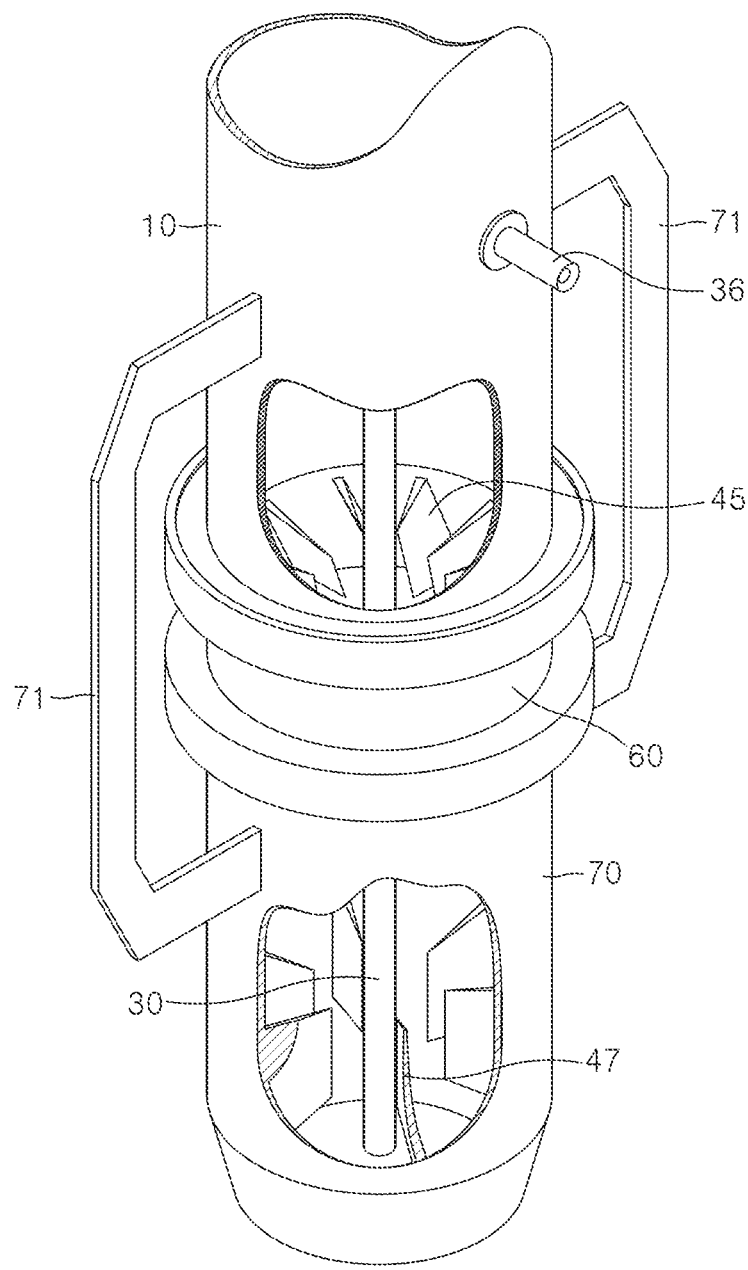
FIG. 17 is a partially-cut perspective view of a main part of an embodiment of the present disclosure including a rotable pipe and a fixed pipe.

In this regard, in the present disclosure as shown in FIG. 17, a fixed pipe 70 which is a pipe body co-axial with the rotable pipe 60 may be further installed at a distal end of the rotable pipe 60, a plurality of fixed blades 47 parallel to a central axis of the nozzle 10 are installed radially around the central axis of the nozzle 10 on the inner circumferential surface of the fixed pipe 70, and the fixed pipe 70 and the nozzle 10 are connected by a restricting member 71 to thereby allow a fluid printing material passed through the rotable pipe 60 to be aligned by the fixed blades 47—embedded fixed pipe 70 before being discharged.

Here, the restricting member 71 may be a plate body that connects and thereby fixes the nozzle 10 to the fixed pipe 70 connected in a freely rotatable manner to a distal end of the rotable pipe 60 and the nozzle 10 so as to allow the rotable pipe 60 to rotate between the nozzle 10 and the stationary fixed pipe 70.

Such a fixed pipe 70—applied embodiment is a configuration that can be applied to a motorized type rotable pipe 60 as shown in FIG. 17, and as a printing material agitated by the rotable pipe 60 with the agitating blades 45 embedded therein may be aligned while being discharged through the fixed pipe 70 with the fixed blades 47 embedded therein, unnecessary excessive rotation of the printing material being discharged may be inhibited, and stable printing as well as solid attachment between the printing material and the filament material 31 may be possible.

INDUSTRIAL APPLICABILITY

The present disclosure relates to a 3D printer for construction for printing and forming various structures, and may be utilized to co-print a filament material with the printing material while embedded in the printing material when discharging a printing material, such as concrete or mortar.

The invention claimed is:

1. A nozzle of a reinforcement material co-printing type 3D printer for construction, wherein in a nozzle (10) of 3D printer for construction, a main pipe (30) parallel to the nozzle (10) is embedded in the nozzle (10), the main pipe (30) being a hollow pipe body having a transfer hole (33) formed in an axial direction therein;
   an exposed pipe (36) as a pipe body having the transfer hole (33) formed in an axial direction therein and exposed outside the nozzle (10) is formed;
   the other end of the main pipe (30) at a distal end of the nozzle (10) is connected to the exposed pipe (36) via a curved pipe (34), such that as a filament material (31) introduced into the transfer hole (33) of the exposed pipe (36) is discharged from an end of the main pipe (30) at the distal end of the nozzle (10) via the main pipe (30), the filament material (31) may be co-printed with a printing material while embedded in the printing material;
   a rotable body (40) is mounted on the main pipe (30) and configured to be freely rotatable about the main pipe (30) without an additional power;
   on an outer circumferential surface of the rotable body (40), a plurality of agitating blades (45) inclined relative to the main pipe (30) are radially formed around the main pipe (30), such that discharging of a fluid printing material via the nozzle (10) brings the agitating blades (45) and the rotable body (40) into rotation around the main pipe (30); and
   on an inner circumferential surface of the nozzle (10) between the agitating blades (45) and a distal end of the nozzle (10), a plurality of fixed blades (47) parallel to a central axis of the nozzle (10) are radially formed around the central axis of the nozzle (10),
   wherein the fixed blades (47) are configured to realign the fluid printing material primarily agitated by the agitating blades (45) while passing therethrough without material segregation.

2. The nozzle of a reinforcement material co-printing type 3D printer for construction of claim 1, wherein a rotable pipe (60) as a pipe body co-axial with the nozzle (10) is installed at a distal end of the nozzle (10) so as to be rotatable around the central axis of the nozzle (10), wherein on an inner circumferential surface of the rotable pipe (60), a plurality of agitating blades (45) inclined relative to the central axis of the nozzle (10) are radially formed around the central axis of the nozzle (10), such that as a fluid printing material is discharged from the nozzle (10), the agitating blades (45) and the rotable pipe (60) rotate around the central axis of the nozzle (10).

3. The nozzle of a reinforcement material co-printing type 3D printer for construction of claim 2, wherein a fixed pipe (70) as a pipe body co-axial with the rotable pipe (60) is installed at a distal end of the rotable pipe (60), wherein on an inner circumferential surface of the fixed pipe (70), a plurality of fixed blades (47) parallel to the central axis of the nozzle (10) are radially formed around the central axis of the nozzle (10); and the fixed pipe (70) and the nozzle (10) are connected by a restricting member (71), wherein the restricting member (71) is a plate body that connects and thereby fixes the nozzle (10) to the fixed pipe (70).

\* \* \* \* \*